(12) United States Patent
Pacheco

(10) Patent No.: US 7,311,112 B2
(45) Date of Patent: Dec. 25, 2007

(54) COLLAPSIBLE, PORTABLE, EASILY DEPLOYED CAR COVER

(76) Inventor: Giovanni Pacheco, P.O. Box 11447, San Juan, PR (US) 00922-1447

( * ) Notice: Subject to any disclaimer, the term of this patent is extended or adjusted under 35 U.S.C. 154(b) by 183 days.

(21) Appl. No.: 11/011,638

(22) Filed: Dec. 14, 2004

(65) Prior Publication Data
US 2006/0124164 A1    Jun. 15, 2006

(51) Int. Cl.
B60J 11/00   (2006.01)
E04H 15/06   (2006.01)

(52) U.S. Cl. .............. 135/88.07; 135/88.05; 296/98; 296/136.1; 296/136.11; 160/370.22

(58) Field of Classification Search ........... 135/88.07, 135/88.05, 903, 88.08, 88.11; 296/98, 136.01, 296/136.1, 136.11, 136.12; 160/370.22; 150/166
See application file for complete search history.

(56) References Cited

U.S. PATENT DOCUMENTS

| | | | | |
|---|---|---|---|---|
| 1,801,711 A * | 4/1931 | Asher ................. | 135/88.07 |
| 2,609,042 A * | 9/1952 | Chamberlain ......... | 160/122 |
| 2,849,012 A * | 8/1958 | Cohen et al. ......... | 135/88.07 |
| 2,859,756 A * | 11/1958 | Barnes ............... | 135/88.07 |
| 2,874,709 A * | 2/1959 | Cohen et al. ......... | 150/166 |
| 2,942,794 A * | 6/1960 | Huso ................. | 242/397 |
| 5,433,499 A * | 7/1995 | Wu .................. | 296/95.1 |
| 5,462,329 A * | 10/1995 | Cheng ............... | 296/98 |
| 5,762,393 A * | 6/1998 | Darmas, Sr. .......... | 296/98 |
| 6,662,849 B1 * | 12/2003 | Hsiung .............. | 160/122 |
| 6,672,643 B1 * | 1/2004 | Brodskiy et al. ...... | 296/98 |
| 6,935,674 B1 * | 8/2005 | Campos ............. | 296/98 |

FOREIGN PATENT DOCUMENTS

DE   19818404 A1 * 11/1999
JP   57095216 A * 6/1982

* cited by examiner

Primary Examiner—David Dunn
Assistant Examiner—Tania Abraham

(57) ABSTRACT

The present invention is a portable collapsible car cover assembly which includes: (a) a collapsible hollow housing with exit sheet exit apertures, which housing has a compact collapsed configuration and an extended deployed configuration; (b) a base which includes a suction cup for fastening the assembly to the roof of a car; (c) which housing contains sheets of protective material wound around rollers when the car cover assembly is collapsed and stored, and wherein the sheets are unwound to cover the trunk, passenger compartment, and hood when the assembly is fully deployed; (d) several elements for attaching the distal end of the sheets of protective material to a car; and (e) at least two security lines for attaching the housing to the car as a theft deterrent.

3 Claims, 5 Drawing Sheets

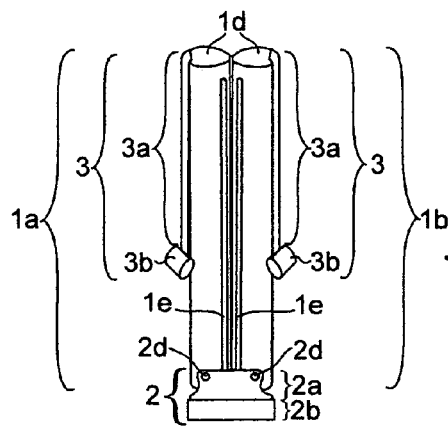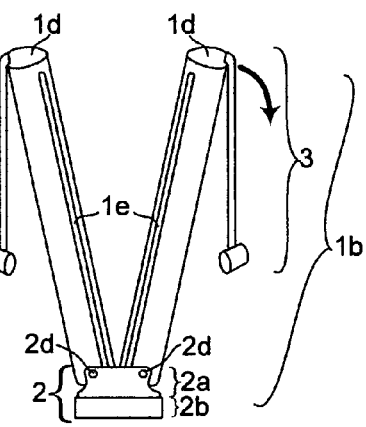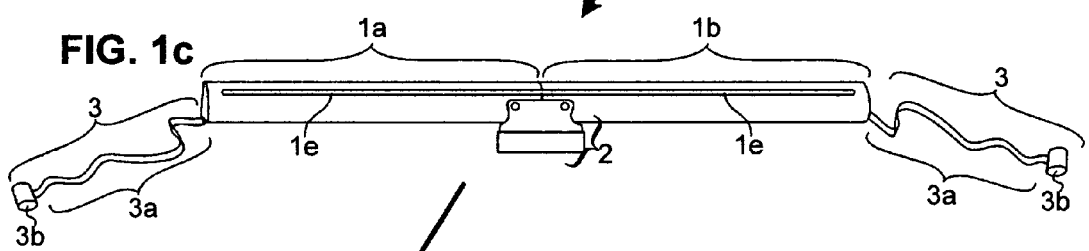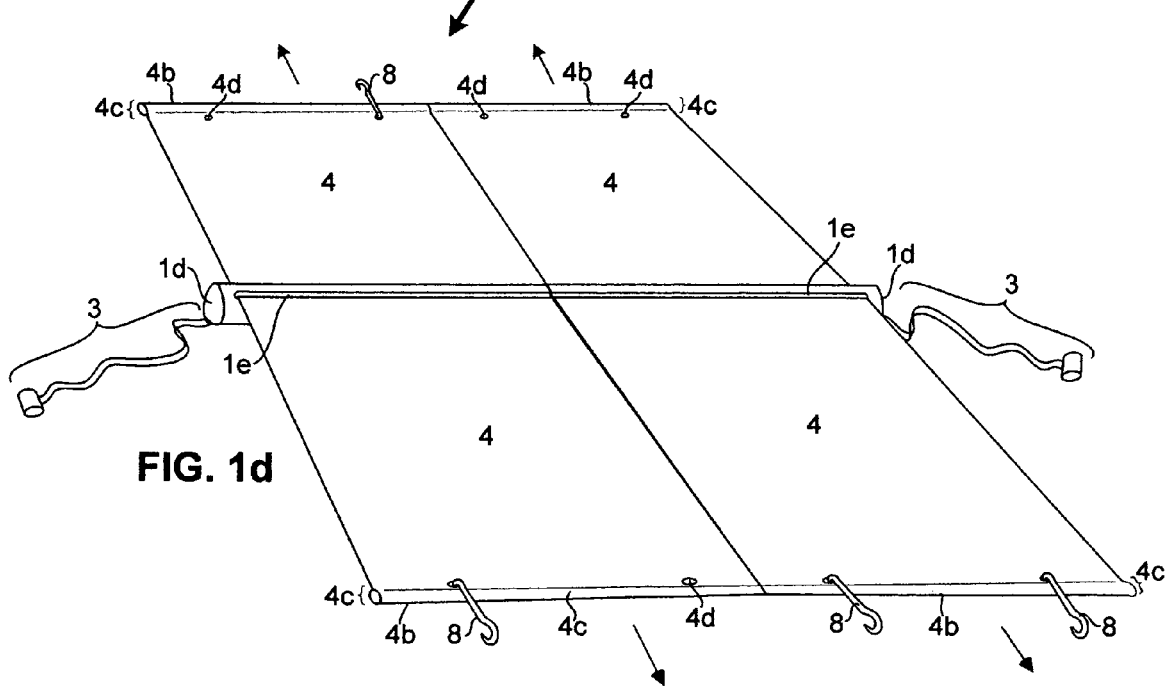

COLLAPSIBLE, PORTABLE, EASILY DEPLOYED CAR COVER

From the moment man first built a horseless carriage or paid hard-earned cash to bring home that dream set of wheels, he sought to protect his investment from wear and tear and to keep it "looking like new." Since a vehicle's surface finish is generally damaged by solar radiation, rain, snow, ice, air- or precipitation-borne corrosive environmental emissions and particulates, and decaying animal (e.g., bird) and plant products, a favored approach has been to cover a vehicle with a protective material. Many. designs for protective covers have been suggested and patented. All are cumbersome to use, remove or store.

Some of the known protective covers are custom-designed to closely fit around the top and sides of a particular make and model of car. See, e.g., U.S. Pat. No. 1,999,171. This type of cover is generally expensive, takes time and effort to deploy or remove, and fits only the make and models for which it was designed. In addition, it is hard or impossible to enter the vehicle or view its contents while this type of cover is deployed.

To streamline deployment and retrieval, certain covers are designed to be wound around rollers. The cover is deployed by unrolling it from a roller, and gathered by re-rolling it. See U.S. Pat. No. 6,779,827.

In some cases, the rollers are attached at a fixed position within the trunk. These devices are generally complicated to install in the trunk and permanently take up valuable trunk space when installed. For example, see U.S. Pat. Nos. 5,516,181, 4,834,446, 4,657,298, 5,597,196, 6,131,643.

In other instances, the car cover assembly is attached to a vehicle's bumper. See U.S. Pat. Nos. 4,732,421 and 4,856,842. This exposes the assembly to damage by bumping the ground, and the assembly is repeatedly drenched with muddy water when the car passes through puddles.

In yet other published car covers, the rollers are placed on top of the car, sometimes at least semi-permanently, including when the vehicle is driven. See U.S. Pat. Nos. 1,999,171, 3,050,075, 4,825,889, 5,401,074, 5,516,171, 6,012,759, and 6,513,858. These roller devices are generally cumbersome and take up too much storage space. Also, the cover sheets in such devices are generally as wide as the vehicle, and cannot accommodate cars that have antennas anywhere in the midline of the car. The present invention overcomes these problems.

SUMMARY OF THE INVENTION

The present invention is a portable, collapsible, easily deployed car cover assembly which includes: (a) a collapsible hollow housing with narrow sheet exit apertures, which housing has a compact collapsed configuration and an extended deployed configuration; (b) a base which includes a suction cup for fastening the assembly to the roof of a car; (c) which housing contains sheets of protective material wound around rollers when the car cover assembly is collapsed and stored, and wherein the sheets are unwound to cover the trunk, passenger compartment, and motor when the assembly is fully deployed; (d) several connectors for attaching the distal end of the sheets of protective material to a car; and (e) at least two security lines for attaching the housing to the car as a theft deterrent.

BRIEF DESCRIPTION OF THE FIGURES

FIGS. 1a-1d illustrate how the car cover assembly is deployed. FIG. 1a depicts the housing 1 (sections 1a and 1b), base 2 (which includes the structural element 2a, the car contact element 2b, and the screws or rivets 2d) and security line 3 (which includes the flexible shear and cut resistant body 3a and the enlarged end element 3b) of a fully collapsed, compact car cover assembly. The sheets are omitted from FIGS. 1a-1c. In FIG. 1b, sections 1a and 1b are pivoted about screw or rivet 2d until the distal ends 1d of each section are maximally separated from each other, as shown in FIG. 1c. FIG. 1d includes the cover sheets, and illustrates the car cover sheets 4 in the extended position. The sheets contain at their distal ends 4b an enlarged region 4c that prevents the distal ends 4b of the sheets 4 from entering sheet exit apertures 1e. The distal ends 4b of the sheets 4 also contain rings 4d that accommodate connectors such as hooks 8.

FIG. 2a is a top view of the assembly without sheets. FIG. 2b is a top surface view with the sheets 4 included; only the distal ends 4b of the sheets 4 which contain enlarged region 4c are visible, sticking out of housing sheet apertures 1e (connectors such as hooks are not included in this view). In FIG. 2c the housing is rendered transparent (dashed lines) to allow the positions of the rollers to be visualized. FIG. 2d depicts a longitudinal and FIG. 2f a transverse cross-section taken along the planes depicted in FIG. 2e.

FIG. 3a shows how sections 1a and 1b swing out by pivoting on screws 2d of the base 2, until the sections are fully extended as shown in FIG. 3b. FIGS. 3b and 3c illustrate how the fully extended sections 1a and 1b of the housing are moved toward each other along housing elliptical slots 1f, such that proximal end 1e of section 1a of the housing fits into proximal end 1e of section 1b. FIG. 3c is an enlarged view of the boxed-in region of FIG. 3b. In FIG. 3c, the side plate of the structural element 2a of base 2 is made transparent (dashed line) to reveal proximal regions 1e of sections 1a and 1b of the housing. FIGS. 3d and 3e depict a housing 1 in which the proximal end 1e of section 1a of the housing is fully inserted into proximal end 1e of section 1b. FIG. 3d is an enlarged view of the boxed in region of FIG. 3e.

In FIGS. 5a and 5b the overlap is minimal; FIG. 5a omits the sheets while FIG. 5b includes them. In FIGS. 5c and 5d sections 1a and 1b are moved toward each other along mated sliding incisions 1g and the overlap is much greater; FIG. 5c omits the sheets while FIG. 5d includes them. FIGS. 5d and 5e are cross-sections taken along. the plane shown in FIG. 5c; FIG. 5d omits the sheets while FIG. 5e includes them.

DETAILED DESCRIPTION

Figure 2A:
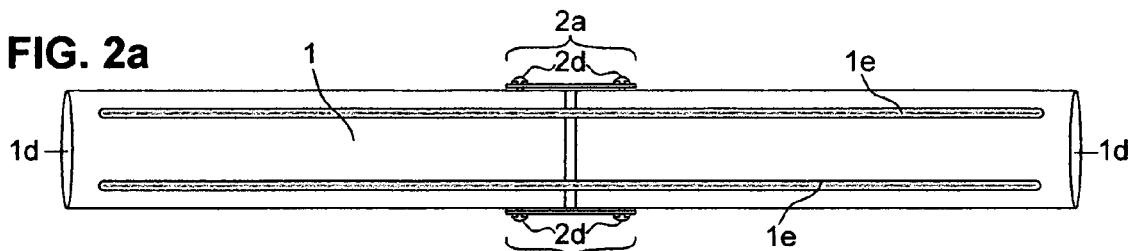
FIGS. 2a-2e show how the internal components of the car cover assembly relate to the housing 1.

The overall goal of the present invention is to provide a universal car cover assembly that is readily portable, compact when not in use for easy storage, easy to install and use, just as easy to uninstall, that when deployed protects any model vehicle (automobile, truck, etc.) from the sun and precipitation while permitting a person to readily enter the vehicle or view its contents while the invention is deployed.

Accordingly, the present invention is a portable, collapsible, easily deployed car cover assembly which includes: (a) a collapsible hollow housing 1 with sheet exit apertures 1e, which housing has a compact collapsed configuration and an extended deployed configuration; (b) a base 2 which preferably includes at least one suction cup 2e for placing and fastening the assembly on a roof of a car; (c) at least two security lines 3 for attaching the housing 1 to the car as a theft deterrent; (d) the housing 1 contains sheets 4 of protective material which are wound around rolling rods 5 when the car cover assembly is collapsed and stored, and which are unwound to cover the trunk, passenger compartment, and motor when the assembly is fully deployed; and (e) a multiplicity of connectors 8 for attaching the distal end 4b of the sheets 4 of protective material to a car. The following is an index of the numbering of the different elements of the invention:

1 Housing
1a Housing section that is collapsed when stored and extended when deployed
1b Housing section that is collapsed when stored and extended when deployed
1c Proximal end (relative to base 2) of housing section 1a or of housing section 1b
1d Distal end (relative to base 2) of housing section 1a or of housing section 1b
1e Housing sheet exit aperture
1f Elliptical screw or rivet slot at proximal region of each housing section 1a and 1b
1g Sliding mated cuts
2 Base
2a Base structural element
2b Base vehicle roof contact element
2c Base screw or rivet slot
2d Screw or rivet
2e Suction cup
3 Security line
3a Flexible cut- and shear-resistant region of security line
3b Enlarged end of security line
4 Car cover sheet
4a Proximal edge of car cover sheet (relative to rod 5)
4b Distal or leading edge of car cover sheet
4c Enlarged element at leading or distal edge 4b of car cover sheet 4 in which the sheet 4 is attached or embedded in the enlarged element 4c
4cAlternate enlarged element in which the sheet 4 wraps around the enlarged element.
4d Ring for attaching a connector at distal region of car cover sheet
5 Rolling rod
6 Automatic retraction device (for example, spring-loaded assembly)
7 Holding strip present at proximal ends of each housing section, for stabilizing rod
8 Connector (e.g., hook) for connecting leading edge of sheet to vehicle The car cover assembly is readily fastened via the base 2 to the roof of a car or other vehicle (e.g., boat, truck, camper, airplane). The retractable vehicle cover sheet 4 extends and retracts quickly and easily. The default position of the sheet 4 is the retracted position. A car cover assembly of the present invention preferably contains an automatic retraction device (such as a spring-loaded assembly) 6 for maintaining each cover sheet 4 automatically retracted and rolled. The distal or leading edge 4b of the extended cover sheet 4 is readily attached to a selected part of a vehicle (typically a bumper, grill, or beam assembly) via connectors 8 such as hooks 8 to prevent the sheets 4 from automatically retracting.

The housing 1 is preferably made of a base material that is strong, light, durable, and resistant to deformation. The base material is either itself scratch and corrosion-resistant or it is covered on its interior and exterior surface with one or more layers or coatings of one or more scratch and corrosion-resistant materials. The exterior surface of the housing 1 is smooth and its edges are preferably rounded to avoid scratching the finish of a car. Examples of base materials that are known in the art are: aluminum, plastic, polyurethane, Kevlar™, composite materials such as those composed of a resin (e.g., a phenolic resin) and carbon. Examples of external layer materials are: enamel, plastic, rubber, zinc metal (commonly known as galvanizing), terne or terne alloy (a metal alloy containing about 80% lead combined with tin), stainless steel, copper alloys and aluminum, and a plated tin coating of carbon steel. See also: Herbert H. Uhlig, "Corrosion and Corrosion Control," John Wiley & Sons, 1965; Harold Hoffman, "The Complete Metal Finishing Book," H&P Publishing, 1992; U.S. Pat. No. 6,652,990 for a "Corrosion-Resistant Coated Metal and Method For Making the Same;" U.S. Pat. No. 6,497,772 for a "Surface Treatment for Improved Hardness and Corrosion Resistance;" U.S. Pat. No. 6,277,450 for a "Method and Composition for Preventing Corrosion;" and references cited therein, which are all fully incorporated by reference.

The principal constraint on the external shape (e.g., cylindrical, oblong, polygonal) and the configuration of the hollow interior of the housing 1 is that the housing 1 should accommodate rolled sheets 4 of cover material in as compact and small a volume while still allowing the sheets 4 to be readily unrolled and rerolled. In a preferred embodiment the housing 1 comprises two hollow somewhat flattened cylindrical sections 1a and 1b (see FIGS. 1a, 1b, 1c and 1d) having an elliptical cross section (see FIG. 2f). Each housing section 1a and 1b has at least two sheet exit apertures 1e (see FIGS. 1a-1d and 2a-2f) through which the rolled cover sheets 4 present in the interior of the housing 1 can exit to the exterior of the housing 1; the edges of the apertures 1e are preferably rounded (see FIG. 2f) to avoid snagging the cover sheets 4 as they are deployed or retracted. Each hollow section 1a or 1b accommodates two sheets 4 rolled around rolling rods 5. See FIGS. 2c-2f. All rolls are oriented within each section with their long axes parallel to each other and to the long axis of the housing 1, with the two members of each pair placed beside each other on either side of the longer diameter of the elliptical cross section of the housing 1 (See FIGS. 2c and 2d)

Figure 3A:
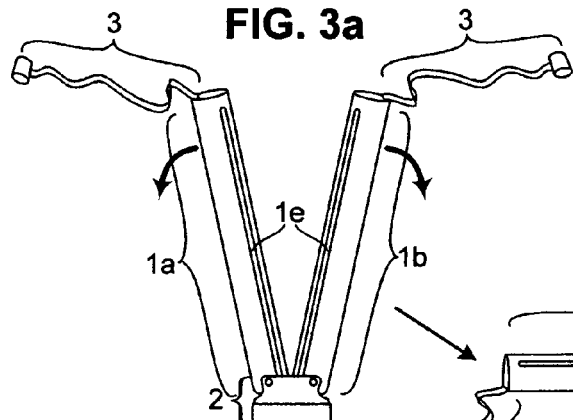
FIGS. 3a-3e illustrate an embodiment in which the proximal end 1e of section 1a of the housing fits into proximal end 1e of section 1b of the housing; the sheets are not depicted.
Figure 3B:
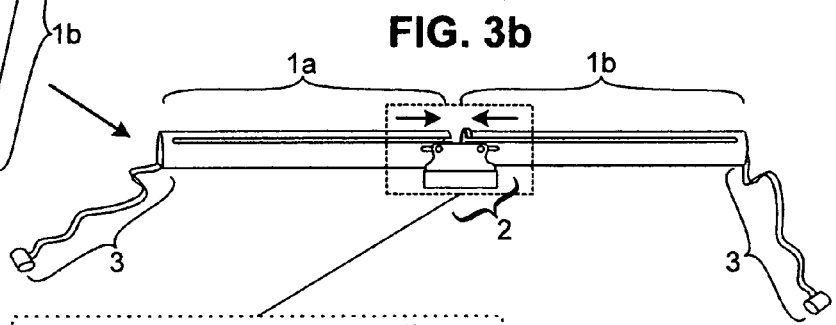
Figure 3C:
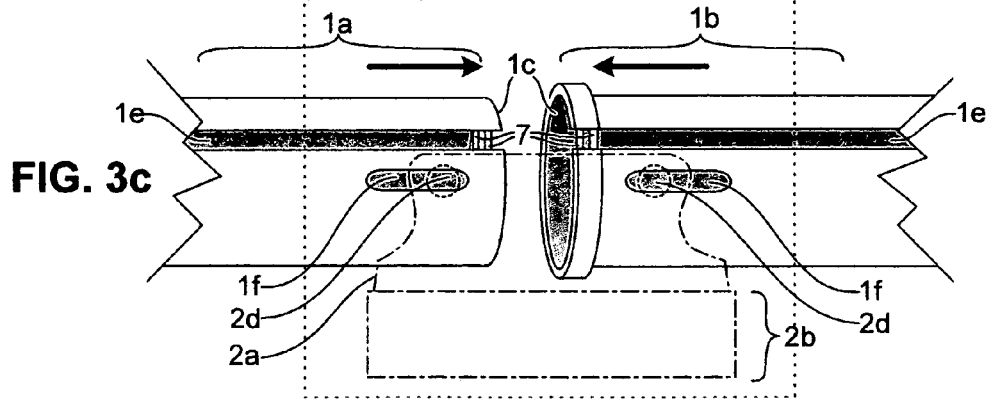
Figure 3D:
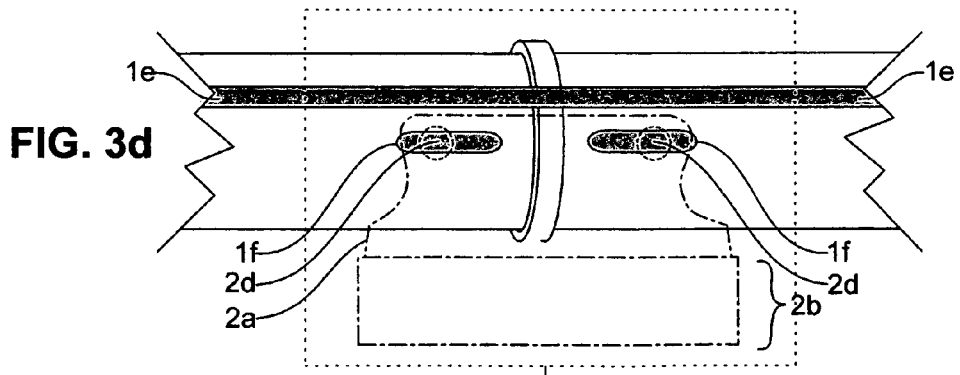
Figure 3E:
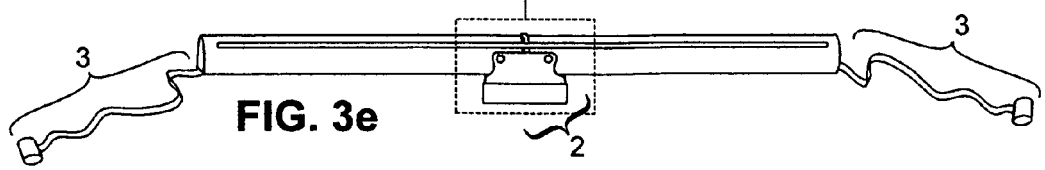

Each flattened cylindrical section 1a and 1b of this preferred embodiment is connected to the base 2 by screws or rivets 2d that pass through screw or rivet slots 2e in the base 2 and also through screw or rivet slots 1f in a proximal end 1c (proximal relative to the base 2) of each flattened cylindrical section 1a and 1b. In certain embodiments the screw or rivet slots 1f in the housing 1 are elliptical to allow housing section 1a and 1b to move toward or away from each other. See FIGS. 3b-3c.

In the storage configuration, the distal ends 1d of each section 1a or 1b that are furthest from the base 2 contact each other laterally. See FIG. 1a. For ease of handling and storage, the housing sections 1a and 1b and particularly their distal ends 1d may be fastened laterally to each other by any of a variety of means: velcro, male-female snaps, a belt, a rubber band, etc.

To deploy a preferred embodiment of the car cover assembly, the distal ends of the housing sections 1a and 1b are separated from each other (see FIG. 1b) by pivoting each cylindrical section 1a or 1b on the screws or rivets 2d that fasten the proximal regions 1c of housing sections 1a and 1b to the base 2. In the extended deployed configuration, the distal ends 1d of each housing section 1a and 1b are maximally separated from each other. See FIGS. 1c, 2a-2c, and FIGS. 3b-3e. The open proximal ends 1c of the housing sections 1a and 1b are optionally modified so that one end fits into the other once the sections are maximally extended and the two sections 1a and 1b are in a straight line. See FIGS. 3a-3e.

The base 2 performs several functions: It keeps the two sections 1a and 1b of the housing 1 connected to and correctly disposed one relative to the other. It provides a fixed support for correctly pivoting the sections 1a and 1b of the housing 1 during deployment. It maintains the open proximal ends 1c of the fully extended sections 1a and 1b of the housing 1 of preferred embodiments of the invention properly spatially aligned so that they may be readily coupled. See FIGS. 3a-3e. The base 2 also anchors the fully deployed car cover assembly to a desired location on a car, usually the roof, and it supports the deployed assembly.

In a preferred embodiment, the base 2 has two components. The first component 2a is mainly structural: it connects the housing sections, serves as a support for correctly pivoting the sections into the deployed configuration, and it supports the deployed assembly. See FIGS. 1a-1c, 2a-2f. This first structural component 2a, like the housing 1, is made of a material that is strong, light, resistant to deformation, and corrosion and weather resistant. The exact shape of this first base component 2a is not critical, but it should facilitate the correct and ready deployment and storage of the cover assembly.

The second base component 2b is attached to the first base component 2a, and it contacts the car surface and fastens the base 2 (and, indirectly, the housing 1) to the car. Because the second component 2b contacts the car finish, it must be smooth and relatively soft so as not to scratch or dent the car surface. Examples include: rubber, foam rubber, foam plastic such as foam latex. In addition, because this second base component 2b also fastens the car cover assembly to the car, it preferably contains one or more elements for attaching the base to the car, such as one or more suction cups 2e (see FIG. 2f) and optionally one or more magnets. The magnets, if present, are embedded in the soft material of the second base component so as not to scratch the car.

Figure 4A:
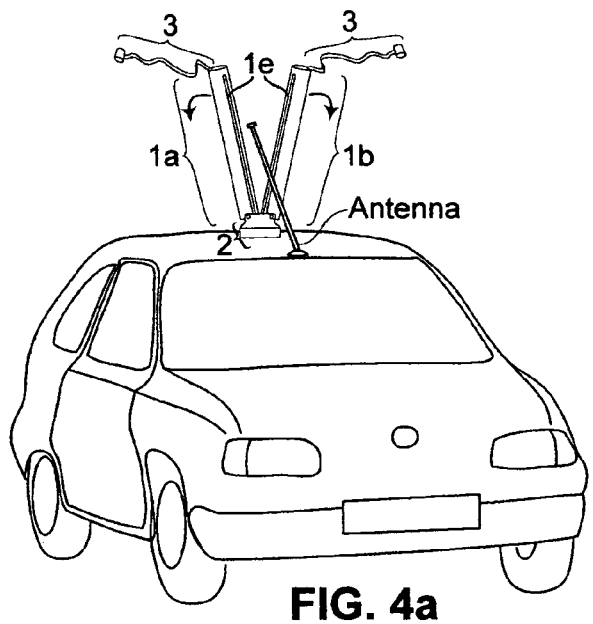
FIGS. 4a-4c depict how the car cover assembly is deployed on a car, particularly illustrating how the car cover fits on either side of antennas located in the midline of the vehicle.
Figure 4B:
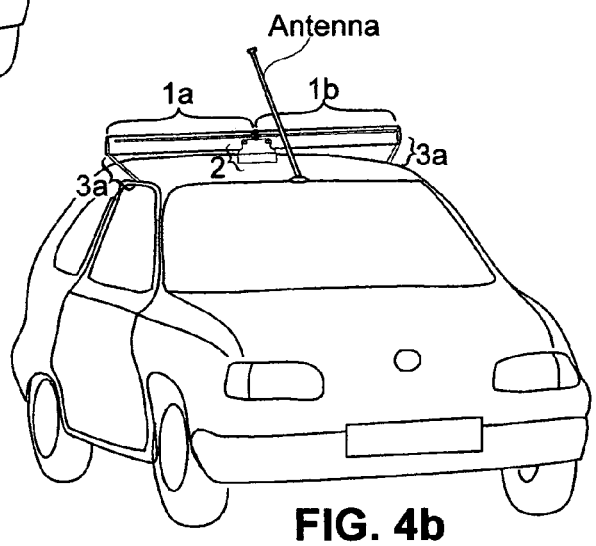
Figure 4C:
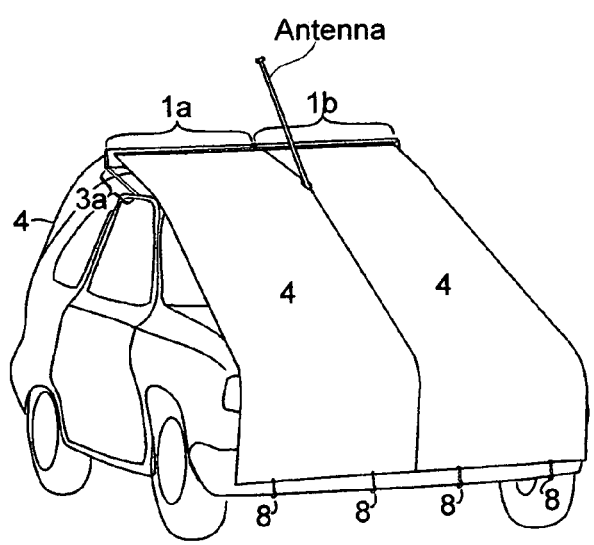
Figure 5A:
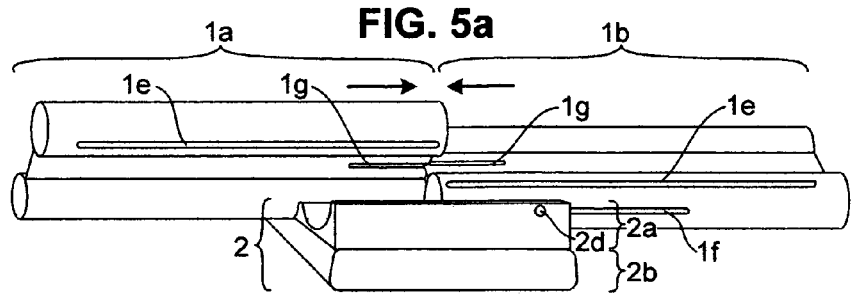
FIGS. 5a-5e depict an alternate embodiment of the invention, in which the sheets in housing sections 1a and 1b overlap and sections 1a and 1b can be moved relative to each other along sliding mated cuts in the flat sections of housing sections 1a and 1b to increase or decrease the overlap.
Figure 5B:
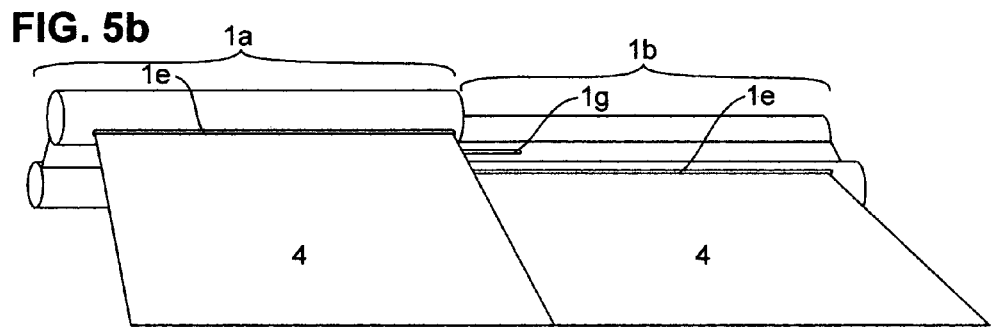
Figure 5C:
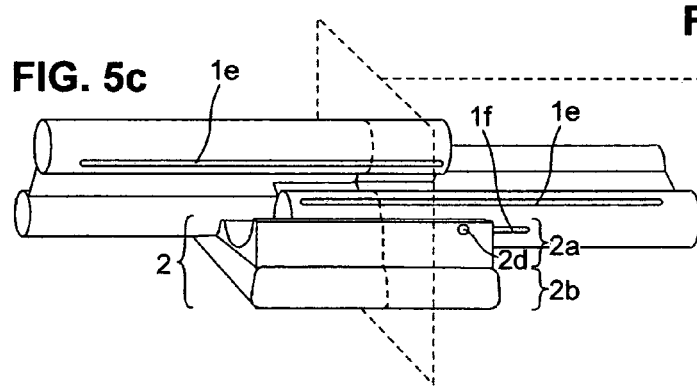
Figure 5E:
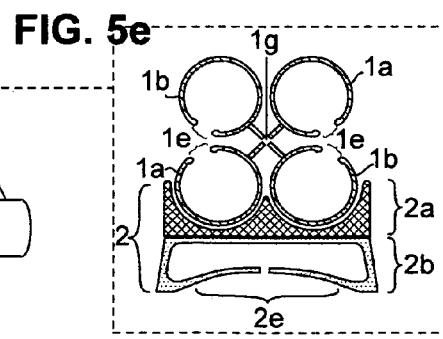
Figure 5D:
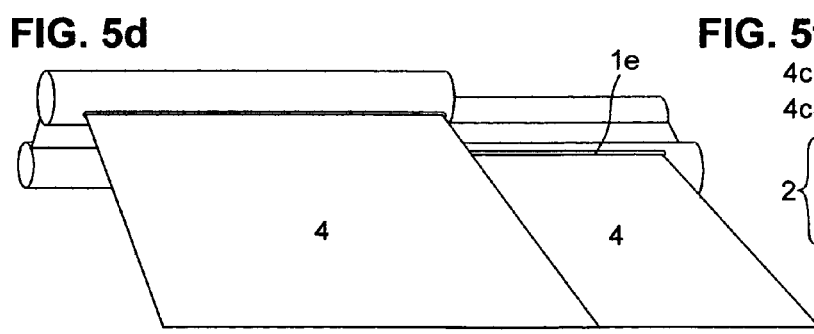
Figure 5F:
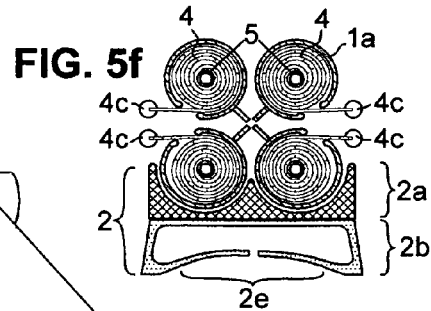

The distal end 1d of each section 1a or 1b of the housing 1 contains one or more security lines 3 that tether the housing 1 to the car and thus deter theft. See FIGS. 1a-1d, 3a, 3b, and 3e for the following description. Each security line 3 contains two elements. The first element is a flexible cut- and shear-resistant region 3a that fits within a closed car door. One end of this first element is attached to the distal end 1d of the housing 1 and the opposite end of the flexible cut- and shear-resistant region 3a is attached to a second enlarged element 3b that does not fit in or slide through the frame of a closed car door. In a preferred embodiment, the first security line element 3a is shaped as a narrow bore wire or alternatively as a meshwork of many wires, or yet again as a flat strip or ribbon. The material may be braided steel or any cut-resistant material. See, e.g., U.S. Pat. No. 4,366,605 for an "Antitheft Cable Device for Car Top Carriers." These cable wires may by interwoven with any of the cut resistant materials disclosed in the above-referenced patents. In any event, the wires are covered with a material (for example, fabric, resin based polymer, plastic or rubber) that yields a smooth surface that does not scratch the finish of a car. The second bulbous security line element 3b has a smooth surface and is a made of a light material such as wood, rubber or plastic in the shape of a ball or a somewhat flattened sphere or cylinder. The security lines 3 are deployed by closing car doors on opposite sides of a car, such that the security line element 3a is trapped or squeezed within the rubber lining of the doorframe and the bulbous element 3b is locked inside the car. See FIGS. 4b and 4c.

Each cover sheet 4 is at least 60% as long and at least 50% as wide as the vehicle it covers; e.g., at least 1-6 feet wide (e.g., 1, 1.5., 2, 2.5., 3, 3.5, 4, 4.5, 5, 5.5., or 6 feet wide) and at least 5-25 feet long (e.g., 5, 6, 7, 10, 15, 20, or 25 feet long). Each sheet 4 is made of a light, strong, durable, relatively thin (about 40, 50, 100, 150, or 200 denier are suitable, but this invention is not limited to these widths) pliable, wrinkle-free or wrinkle-resistant material or combinations of materials. Preferred materials include those that make the sheets light, strong, poor heat conductors and also resistant to sunlight, rain, snow, sleet and tears and cuts. Examples of suitable materials include: canvas, nylon, polyester, polyethylenenaphthalate (PEN), polyethylenenaphthalatebibenzoate (PENBB), or other aliphatic hydrocarbon resin derivatives, and combinations thereof. These materials may be woven, knitted or scrim. They may be co-synthesized or coated with other substances to improve their strength or protective properties: for example, titanium dioxide is useful for reducing UV transmission. Other useful fabrics and materials and methods of making them are described in the following patents: U.S. Pat. No. 6,599,850 for "Flexible Reflective Insulating Structures;" U.S. Pat. No. 6,013,586 for a "Tent Material Product And Method Of Making Tent Material Product;" U.S. Pat. No. 5,230,941 for an "Insulative Material With Reflective Space;" U.S. Pat. No. 4,247,599 for a "Composite Sheet Material Having Low Emittance Characteristics;" U.S. Pat. No. 6,818,091 for a "Cut And Puncture Resistant Laminated Fabric;" U.S. Pat. No. 6,715,791 for an "Air Bag Tether System Comprising Multiple Segments Cut In Alignment With Fabric Warp Of Fill;" U.S. Pat. No. 6,694,719 for a "Cut Resistant Yarns And Process For Making The Same, Fabric And Glove;" U.S. Pat. No. 6,581,366 for a "Cut-Resistant Stretch Yarn Fabric And Apparel;" U.S. Pat. No. 6,534,175 for a "Cut Resistant Fabric;" U.S. Pat. No. 6,161,400 for a "Cut-Resistant Knitted Fabric;" U.S. Pat. No. 6,159,590 for a Puncture And Cut Resistant Fabric;" U.S. Pat. No. 6,131,419 for a "Two Face Cut Loop Fabric;" U.S. Pat. No. 6,126,879 for a "Method Of Making A Cut-Resistant Fiber And Fabrics, And The Fabric Made Thereby;" U.S. Pat. No. 6,105,400 for a "Warp Knitted Cut Pile Fabric Having Opening Pattern And Superior Elasticity;" U.S. Pat. No. 6,103,371 for a "Cut Resistant Yarn And Fabric;" U.S. Pat. No. 6,001,474 for a "Cut Resistant Yarn And Fabric;" U.S. Pat. No. 5,906,873 for a "Puncture, Pierce, And Cut Resistant Fabric;" U.S. Pat. No. 5,853,885 for a "Cut Resistant Yarn And Fabric;" U.S. Pat. No. 5,853,863 for a "Puncture, Pierce, and Cut Resistant Fabric;" U.S. Pat. No. 5,721,179 for a "Cut Resistant Fabric, Apparel, and Yarn;" U.S. Pat. No. 5,660,910 for an "Increased Tear Strength Nonwoven Fabric And Process For Its Manufacture;" U.S. Pat. No. 5,482,763 for a "Light Weight Tear Resistant Fabric;" U.S. Pat. No. 5,308,674 for a "Tear-Resistant Stitchbonded Fabric;" U.S. Pat. No. 5,119, 512 for a "Cut Resistant Yarn, Fabric And Gloves;" and U.S. Pat. No. 6,451,410 for a "Flexible, cut resistant, and abrasion resistant sheet material and method for making same".

Two different materials with different properties may be co-woven or co-polymerized together to form a sheet that exhibits the properties of both materials. For example, fibers or threads of a strong, light, high tensile strength fiber such as nylon may be co-woven with fibers or threads of a shear resistant material such as canvas or metal fibers. In addition, the materials may be layered asymmetrically. For example, a top side of a sheet contains a material or materials that are weather resistant (e.g., reflects solar radiation such as U.V. and/or infra-red light, has poor heat conductance, is impervious to moisture) while a lower side contains materials that render the sheet strong and shear resistant. Examples of sheet materials include: a layer of Neoprene™-coated nylon fabric and an outer layer of aluminized nylon; or Neoprene™-coated nylon covered by co-woven Dacron™ and Teflon™, or Neoprene™-coated nylon covered by layers of thin Kapton™ and glass-fiber cloth, by layers of Mylar™ and spacer material, and outer layers of Teflon™-coated glass-fiber Beta cloth, or Neoprene™-coated nylon covered by insulating layers of aluminized Mylar™ plastic and unwoven Dacron™, or Neoprene™-coated nylon covered by an outer layer of Ortho™ fabric, which is a combination of Teflon™, Kevlar™, and Nomex™ with a Neoprene™ liner. The top exposed layer of each fully deployed sheet may also contain dyes, patterns, colored designs, and even advertisements for goods, services or businesses.

Figure 2B:
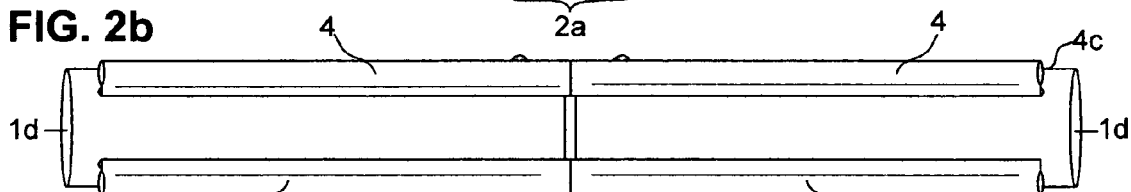
Figure 2C:
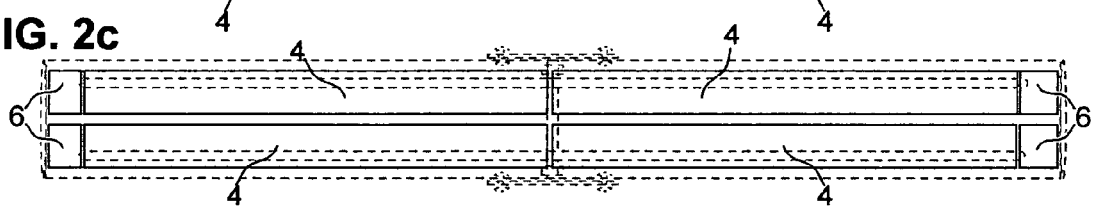
Figure 2D:
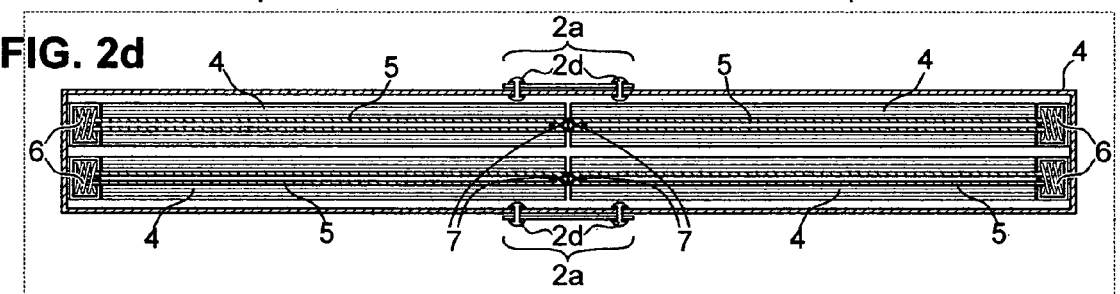
Figure 2E:
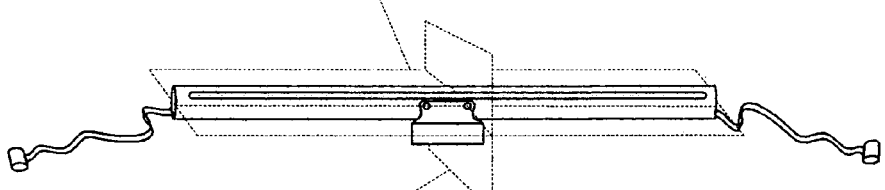
Figure 2F:
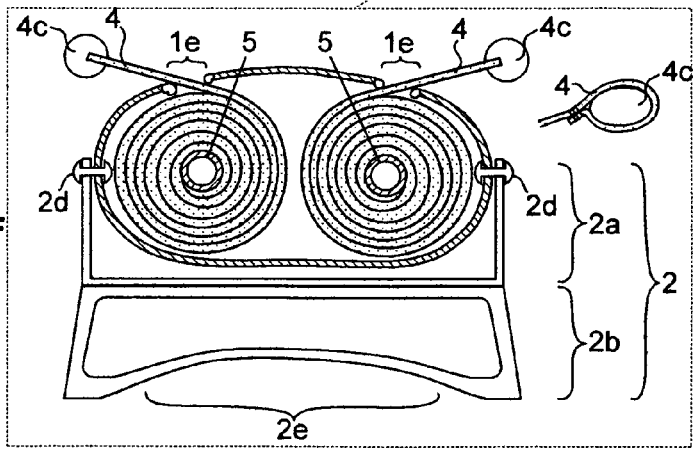

Each sheet 4 contains a proximal end or edge 4a that is attached to a rod 5 (see FIG. 2f) and an opposite distal or leading end or edge 4b that protrudes through a sheet exit aperture 1e in the housing 1 (see FIGS. 1d and 2b). The rod 5 is made of a firm, light, durable material such as wood, plastic, or metal (e.g., aluminum). The rod 5 may be hollow to make it lighter. The rod 5 is rollably linked to the housing 1. "Rollably linked" means that the rod 5 is linked to the housing 1 in such a way that the rod 5 is able to rotate or roll. In preferred embodiments, the rod is rollably linked at at least one end to a self-winding automatic retraction device 6 that is attached to the housing that automatically maintains the sheet in a default rolled configuration. See FIGS. 2c and 2d. The automatic retraction device 6 may be a spring mechanism 6, such as for example the spring mechanism used with household window shades. In a preferred embodiment, the rod 5 is also rollably linked at its opposite end to a stabilizing cross strip 7 that is attached to the housing 1. As the description suggests, this stabilizing strip 7 stabilizes the rod 5 relative to the sheet exit aperture 1e so that the rod is maintained in the best position for easily and smoothly deploying and retracting the cover sheet 4.

When not deployed, each sheet 4 is substantially wound around the rod 5 to which it is attached within the interior of the housing 1 (see FIGS. 2d and 2f), with only the distal end 4b of the sheet protruding through a sheet exit aperture 1e of the housing 1 (see FIG. 2b). The distal end 4b of each sheet 4 contains or is attached to one or more enlarged elements 4c that do not fit through the sheet exit apertures 1e of the housing 1 and thus do not permit the distal end 4b of the sheet 4 to enter into the hollow interior of the housing 1. See FIGS. 1d and 2f. These distal enlarged elements 4c may be flattened spheres, hooks or a single flattened cylinder that is the same length as the protruding edge of the sheet.

When the car cover is fully deployed, each sheet 4 extends from inside the housing 1 through the sheet exit apertures 1e of the housing 1 to either the front or rear of a car. See FIG. 4. Each sheet 4 contains at its distal end 4b two or more connectors 8 that attach the distal end 4b of a sheet 4 to a desired region of a car. See FIG. 1d. In preferred embodiments, a connector 8 is a hook that attaches a sheet 4 to a bumper of a car. See FIG. 1d. The connector 8 can be attached to a sheet 4 in a variety of ways. For example, a hook 8 can be attached to an enlarged element 4c at a distal edge 4b of a sheet, or an enlarged element 4c may itself be a hook. Alternatively, the distal edge 4b of each sheet 4 optionally contains rings 4d to which the hooks are attached. See FIG. 1d.

One significant problem with existing car cover devices is that the single cover sheet used in these devices extended from one side to the other side of a car and thus could not accommodate (and was unsuitable for) cars having antennas, especially non-retractable antennas, positioned along the front to rear midline (front center, rear center, or dead center of the roof, trunk, or hood). Even laterally placed antennas presented a formidable obstacle for devices in which the covers draped over the side of a car.

The present invention overcomes this problem in at least two ways. First, since the instant vehicle cover comprises a pair of sheets 4 that extend to the front of a vehicle and another pair of sheets 4 that extend to the rear of a vehicle, either pair accommodates midline antennas by passing on either side of such antennas. See FIGS. 4a-4c.

Secondly, for those vehicles having antennas positioned on either side of the vehicle roof, trunk or hood, in certain embodiments of the present invention the sheets in housing sections 1a and 1b overlap and sections 1a and 1b can be moved relative to each other to increase or decrease the overlap. See FIGS. 5a-5g. (In these embodiments, the edge between the proximal end of each housing section 1a and 1b and the region of the housing that faces down when the assembly is fully deployed may be curved to facilitate pivoting during deployment and uninstallment.) In addition, in other embodiments, at least one sheet 4 of each pair includes closable reinforced lateral slits (not shown) positioned at intervals along the free lateral edges of the sheets that are oriented to the sides of a car.

The covers of the present invention cover the top surface of the trunk, hood and passenger compartment, and the front and back of the vehicle, but not the sides. See FIG. 5c. This protects the covered top regions of the vehicle, which generally suffer the most damage from the environment, including the dashboard, upholstery and speakers, while allowing a person to view the contents or even enter the vehicle.

In the collapsed position, the embodiments of the invention are compact and fit comfortably within the trunk without permanently occupying valuable space like published car covers.

While the preceding text and drawings describes or depict a number of preferred embodiments of the present invention, these are only illustrative. They do not limit the scope of the claims. Certain changes or variations of the present invention that may be envisioned by those skilled in the art are contemplated by, and remain within the scope of, the claims. Every reference (especially patent) mentioned herein is hereby completely incorporated by reference for all purposes.

What is claimed is:

1. A collapsible, portable, easily deployed car cover assembly, comprising: a.) a collapsible housing having a hollow interior and at least two cover sheet exit apertures and further having a compact collapsed configuration and an extended deployed configuration; b.) at least one base element linked to said housing, for placing the housing at a selected location on a car; c.) at least two security lines linked to said housing, which are securely attached to the car when the car cover assembly is deployed; d.) a multiplicity of rollers contained within and rollably linked to said housing; e.) four protective cover sheets arranged in pairs, wherein each sheet has a proximal end that is attached to a roller and a distal end that passes through and protrudes from one of said exit apertures in the housing, wherein each sheet has a retracted configuration in which said sheet is substantially wound around a roller and a deployed configuration in which said sheet extends through one of said exit apertures to cover a top surface of the car, wherein each pair of sheets overlap each other laterally, wherein a first pair when deployed extends through exit apertures in the housing to a front end of the car, and a second pair when deployed extends through exit apertures in the housing to a back end of the car; and f.) a multiplicity of connectors for fastening said sheets to the car, wherein said fasteners are attached to selected sites of said sheets.

2. A car cover according to claim 1, wherein said base element comprises a suction cup.

3. A car cover according to claim 1, wherein each said security line comprises a flexible shear-resistant region and a distal large element that does not fit through a locked door.

* * * * *